April 4, 1961  J. A. CLEMENTS ET AL  2,978,056
AUTOMATIC STEERING DEVICE
Filed April 8, 1957  2 Sheets-Sheet 1
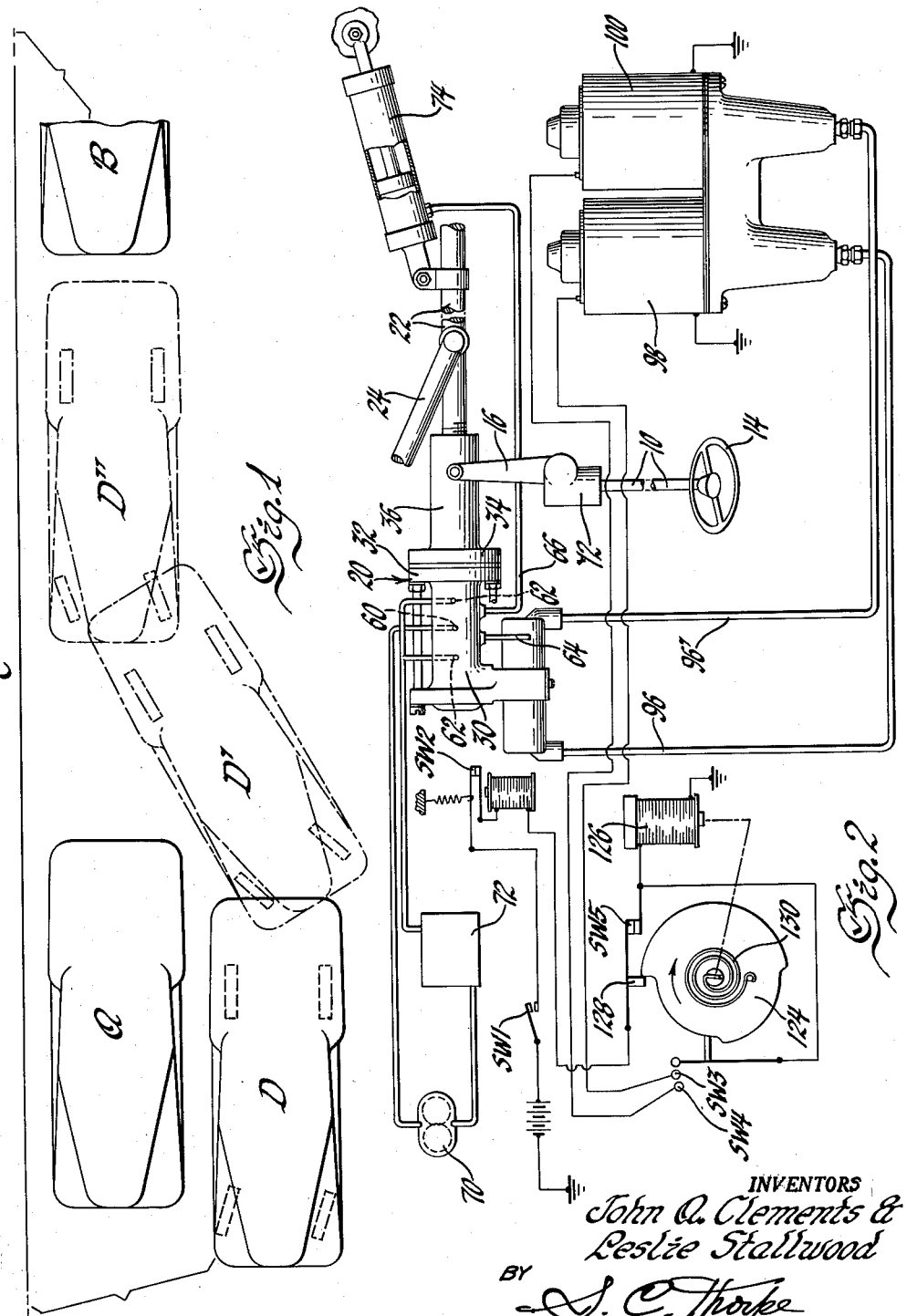
INVENTORS
John Q. Clements &
Leslie Stallwood
BY
S. C. Thorpe
ATTORNEY

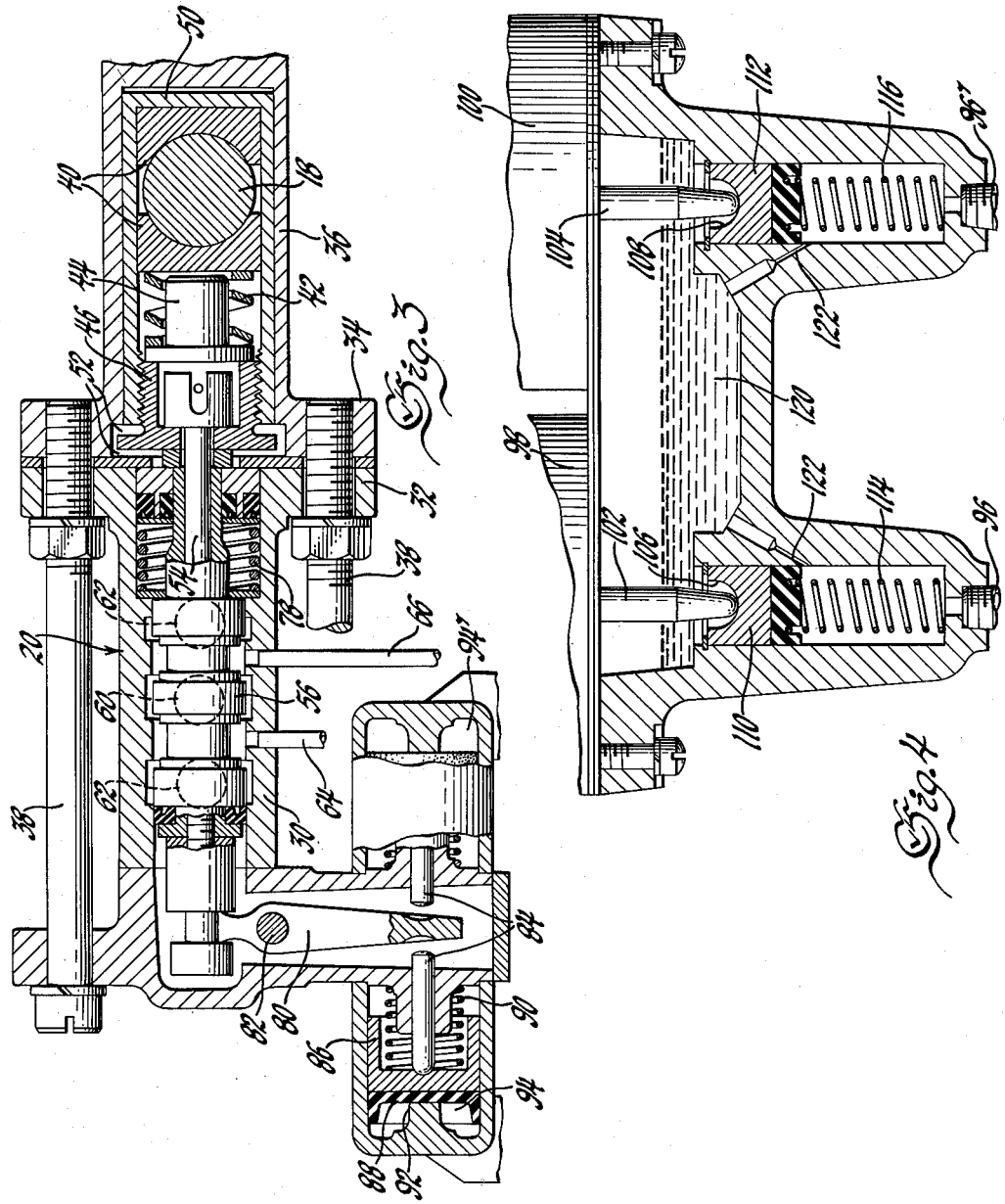

United States Patent Office 2,978,056
Patented Apr. 4, 1961

2,978,056

AUTOMATIC STEERING DEVICE

John A. Clements, Brownsburg, and Leslie Stallwood, Indianapolis, Ind., assignors to General Motors Corporation, Detroit, Mich., a corporation of Delaware Filed Apr. 8, 1957, Ser. No. 651,431

6 Claims. (Cl. 180—79.2)

This invention relates to a system of apparatus for application to an automotive vehicle equipped with power steering to accomplish automatically a "pre-set" maneuver, by which is meant a maneuver that must conform to a certain pattern determined by fixed conditions, e.g., a curve or curves in a driveway traversed daily incident to backing from a garage into a street, a parking maneuver, as where it is desired to position the vehicle parallel to a curb between two previously parked cars, etc.

The invention is considered particularly valuable as applied in connection with the last-mentioned operation, which even with the advent of power steering is accomplished by many individuals only with annoying difficulty, and with the expenditure of considerable time in many cases. The annoyance is not limited to the driver since the operation often delays traffic on busy city streets, and if prolonged increases the likelihood of mishaps of varying seriousness.

According to the invention, the parking of the vehicle or other maneuver is achieved with substantially no effort on the part of the driver and in a minimum of time.

Generally described, the apparatus herein comprises a mechanism, as a cam or equivalent instrumentality, which is operated in accordance with the amount of rotation of the road wheels and which controls electrical means in turn hydraulically governing the action of the power steering control member as required to achieve the maneuver. In effect, the apparatus takes over the steering function from the operator during the maneuver, although it may be so designed that the operator can at any time overrule the apparatus if he desires. With the vehicle initially properly placed for the maneuver, the operator during the maneuver need operate only the accelerator and brake pedal; in fact, if the vehicle is equipped with an automatic transmission set to allow some "creep," the operator may be required only to manipulate the brake.

While utilizable with respect to substantially any power steering apparatus, the invention is considered especially significant as applied to a hydraulic power steering gear of the type wherein the control valve is carried by a linkage member. Such a gear is shown, for example, in copending application Serial No. 568,010, filed February 27, 1956, in the names of George B. Meginnis and John A. Clements, one of the present applicants and assigned to the assignee herein.

Applied as just indicated, the invention is particularly distinguished in that the means governed by the previously mentioned cam or equivalent instrumentality is a pair of solenoids which operate via a hydraulic link to shift the power steering control valve as necessary to effect the desired maneuver.

A preferred embodiment of the invention is illustrated by the accompanying drawings which will be referred to in the further description.

In the drawings,

Fig. 1 shows the parking operation with reference to which the particular apparatus was designed;

Fig. 2 is a generally diagrammatic representation of the apparatus as installed; and Figs. 3 and 4 are sections showing control parts.

Referring first to Figure 2, the numeral 10 deontes a steering shaft terminating in gear box 12 and mounting the usual steering wheel 14 at its upper end. Fixed to the output component of the reduction gearing is a pitman arm 16 carrying a ball stud 18 through which the power steering control valve 20 is actuated. This valve is mounted on the end of the drag link 22 which has connection with a pair of tie rods of which only one, 24, is shown in the drawing. Each tie rod is linked to a corresponding steering knuckle arm, not illustrated, such linkage members being well known and understood in the art.

Valve 20 (Fig. 3) includes a housing 30 having a flange 32 complementary to a flange 34 forming part of an adaptor 36 threadingly connected to the drag link 22. Elongated bolts 38 are shown as used to make the connection between the adaptor and valve housing. Within the adaptor the pitman arm ball stud 18 is accommodated between a pair of seats 40, the inner of which is loaded by a spring 42 encircling the shank of a guide member 44. The head of such guide member abuts a plug 46 threaded into the end of a sleeve 50 slidable within the adaptor to the extent of the clearances 52.

Plug 46 being fixedly connected to rod 54, valve spool 56 partakes of any axial movement of the sleeve 50.

Spool 56, comprising three lands, is functional with respect to an inlet port 60, exhaust ports 62 and power ports 64 and 66 which extend to the opposite ends of the cylinder 74. As shown, the spool is in its neutral position relative to the valve housing. With the spool so positioned, pressure fluid supplied by pump 70, which draws from reservoir 72, circulates through the valve and back to the reservoir against the static pressure of the fluid in the motor 74.

A spring 78 presents a resistance which must be overcome in the displacement of the valve spool and thus exerts a centering action. If desired, pressure fluid may be admitted to the chamber housing the spring so as to provide an "artifical feel" as described, for example, in United States Patent No. 2,827,123 to Clovis W. Lincoln et al., and owned by the assignee herein.

At its lefthand end, spool 56 has connection with a lever 80 pivoted at 82 and depending in position for engagement by plungers 84. Each such plunger at its opposite end is fixedly secured to a piston 86 having back-to-back relation with a seal 88. A spring 90 serves to maintain the piston in shown position with the seal 88 abutting a boss 92.

With the arrangement as described, it should be apparent that each piston 86 is movable by fluid pressure at 94 to bring about swinging of the lever 80 and axial displacement of the valve spool 56.

Shown below the valve actuating means is a pair of solenoids 98 and 100 having armature plungers 102 and 104 (Figure 4) terminating in recesses 106 and 108 formed in pistons 110 and 112, respectively. Each piston 110 and 112 is loaded against the end of the corresponding armature plunger via a spring 114, 116. The chamber housing the spring, with the corresponding conduit 96, 96' and the corresponding chamber 94, 94' is at all times filled with fluid so that on energization of either solenoid the downward movement of the affected plunger 110, 112 is accompanied by inward displacement of the corresponding piston 86, causing swinging of the lever 80 and axial movement of the valve spool 56.

A reservoir 120 serves as the source of make-up fluid, supplied via passages 122, and assists in the bleeding of air from the system. The orifices in the passages 122 prevent interference with the operation of the hydraulic links by which is meant the fluid in conduits 96 and 96' interconnecting the pistons 110, 112 and the pistons 86.

It is now believed in order to describe the operation of the apparatus with the aid of that portion of Figure 2 illustrating the electric circuitry. As previously mentioned herein, the sequence of operations illustrated by Figure 1 is automatically brought about by a cam or equivalent instrumentality denoted by the numeral 124. This cam is advantageously driven by a take-off from the speedometer drive and is under the control of a solenoid 126 governing a clutch which when engaged operably connects the cam to the take-off shaft for rotation thereby. The cam is normally in its position shown, being held against a stop 128 by a spring 130.

A cam assembly which has been found suitable for commercial use is described and claimed in co-pending application Serial No. 568,010, filed February 27, 1956, in the names of George B. Meginnis and John A. Clements. In view of the disclosure of such application, it is not deemed necessary to supply a detailed description of the assembly here.

Let it be assumed now that the vehicle (Fig. 1) has been brought to a position where it is located approximately 2½ feet from the side of car A at curb C and about 1 foot forward of the rear bumper of car A. With the vehicle so positioned, the transmission control lever is placed in reverse causing closing of switch SW1. Thereafter, a knob in the driver's compartment is turned to close holding switch SW2, energizing the circuits. With the circuits energized, the solenoid 126 effects clutching of the cam 124 to the take-off from the speedometer drive shaft, bringing about clockwise rotation of the cam as indicated by the arrow. It should be readily seen that rotation of the cam is accompanied by sequential closing of switches SW3 and SW4. Closing of switch SW3 applies potential to the solenoid 98 which operates as previously described to displace valve spool 56 to the left. Such movement of the valve spool results in the creation of a pressure differential cross the piston in the fluid motor 74 in favor of the left end of the motor. This forces the cylinder component of the motor leftwardly, swinging the dirigible wheels of the vehicle to the right as desired. With the dirigible wheels so turned, the operator (keeping his hands off the steering wheel) depresses the accelerator and the vehicle moves rearwardly, the front end thereof swinging outwardly as required. Since cam 124 rotates in correspondence with the amount of rotation of the road wheels, switch SW3, at the proper time, becomes open and switch SW4 controlling the solenoid 100 becomes closed to effect leftward swinging of the dirigible wheels (position D", Fig. 1).

The dirigible wheels are maintained swung to the left throughout the stage represented by positions D' and D". Straightening of such wheels to center the vehicle between cars A and B is accomplished with the normal power assist. It should be emphasized at this point that the clearance between each plunger 84 and the corresponding side of the lever 80 is such that with the solenoids de-energized there can be no interference with the normal operation of the power steering gear.

Clutch-control solenoid 126 remains energized until switch SW5 is opened by cam 124 with the vehicle in position D". Opening of such switch is brought about by engagement of the cam surface with the underside of the stop 128. On the opening of switch SW5, switch SW2 spring open to assume its normal position shown. Also, on the opening of switch SW5, spring 130, which winds up incident to the clockwise rotation of the cam spins the cam counterclockwise to its shown position against the stop 128.

On the foregoing, it should be clear that the invention provides a simple and inexpensive way to obtain the benefits of automatic parking in a power steering-equipped car at very little expense. Additionally, the invention is advantageous in that the apparatus is very compact, rugged in construction and easily accessible.

What is claimed is:

1. In an automotive vehicle having a steering wheel or the equivalent and equipped with a power steering gear including a control component governing the power means, said control component being normally actuated incident to the application of manual effort at said steering wheel, the combination of apparatus whereby said power steering gear may be utilized in the accomplishment of a pre-set maneuver without the imposition of any manual effort at said steering wheel, said apparatus comprising control means adapted to operate in accordance with the amount of rotation of the road wheels of the vehicle, electrical means governed by said control means, and an hydraulic linkage between said electrical means and said control component including plunger means whereby on energization of said electrical means the fluid in said hydraulic linkage is caused to become displaced to displace said control component as necessary to bring said power means into play in the manner required for the maneuver.

2. In an automotive vehicle having a steering wheel or the equivalent and equipped with a power steering gear including a control component governing the power means, said control component being normally actuated incident to the application of manual effort at said steering wheel, the combination of apparatus whereby said power steering gear may be utilized in the accomplishment of a pre-set maneuver without the imposition of any manual effort at said steering wheel, said apparatus comprising control means adapted to operate in accordance with the amount of rotation of the road wheels of the vehicle, a pair of solenoids governed by said control means, hydraulic linkages between said solenoids and said control component including plunger means whereby on alternate energization of said solenoids the fluid in said linkages is caused to become displaced to displace said control component as necessary to bring said power means into play in the manner required for the maneuver.

3. In an automotive vehicle having a steering wheel or the equivalent and equipped with a power steering gear including a fluid motor and a control valve therefor, said control valve being normally actuated incident to the application of manual effort at said steering wheel, the combination of apparatus whereby said power steering gear may be utilized in the accomplishment of a pre-set maneuver without the imposition of any manual effort at said steering wheel, said apparatus comprising control means adapted to operate in accordance with the amount of rotation of the road wheels of the vehicle, electrical means governed by said control means, an hydraulic linkage between said electrical means and said control valve including plunger means whereby on energization of said electrical means the fluid in said hydraulic linkage is caused to become displaced to displace said control valve as necessary to bring said motor into play in the manner required for the maneuver.

4. In an automotive vehicle having a steering wheel or the equivalent and equipped with a power steering gear including a fluid motor and a control valve therefor, said motor and said valve being both associated with a steering linkage member, said valve being normally actuated incident to the application of manual effort at said steering wheel, the combination of apparatus whereby said power steering gear may be utilized in the accomplishment of a pre-set maneuver without the imposition of any manual effort at said steering wheel, said apparatus comprising cam control means adapted to operate in accordance with the amount of rotation of the road wheels of the vehicle, a pair of solenoids governed by said cam control means through a plurality of switches associated therewith, an hydraulic linkage between each said solenoid and said control valve including plunger means whereby on alternate energization of said solenoids the fluid in said hydraulic linkages is caused to become displaced to displace said control valve as necessary to bring said motor into play in the manner required for the maneuver.

5. In an automotive vehicle having a steering wheel or the equivalent and equipped with a power steering gear including a hydraulic motor and a control valve therefor, said motor and said valve both being associated with a single steering linkage member, said valve being normally actuated incident to the application of manual effort at said steering wheel, the combination of apparatus whereby said power steering gear may be utilized in the accomplishment of a pre-set maneuver without the imposition of any manual effort at said steering wheel, said apparatus comprising cam control means adapted to rotate in accordance with the amount of rotation of the road wheels of the vehicle, a pair of solenoids governed by said cam control means through a plurality of switches associated therewith, and hydraulic linkages between each said solenoid and said valve, each said linkage including a plunger actuated by the corresponding solenoid and a plunger operably connected to said valve through lever means, whereby on alternate energization of said solenoids the fluid in said linkages is caused to become displaced to displace said valve as necessary to bring said motor into play in the manner required for the maneuver.

6. In an automotive vehicle having a steering wheel or the equivalent and equipped with a power steering gear including a hydraulic motor and a control valve therefor, said motor and said valve both being associated with a single steering linkage member, said valve being normally actuated incident to the application of manual effort at said steering wheel, the combination of apparatus whereby said power steering gear may be utilized in the accomplishment of a pre-set maneuver without the imposition of any manual effort at said steering wheel, said apparatus comprising lever means operatively associated with said valve, opposed chambers each confining a piston actuable to engage said lever means, cam control means adapted to rotate in accordance with the amount of rotation of the road wheels of the vehicle, switch means controlled by said cam control means, a pair of solenoids in the electric circuit including said switch means, each such solenoid having associated therewith means providing a chamber, a plunger in each of said last-mentioned chambers actuated by movement of the corresponding solenoid armature, and a body of fluid between each of said last-mentioned plungers and one of said first-mentioned plungers.

References Cited in the file of this patent

UNITED STATES PATENTS

| | | |
|---|---|---|
| 2,424,288 | Severy | July 22, 1947 |
| 2,736,015 | Gilvarry et al. | Feb. 21, 1956 |
| 2,797,764 | Wysong, et al. | July 2, 1957 |